United States Patent [19]

Springer

[11] Patent Number: 4,953,403

[45] Date of Patent: Sep. 4, 1990

[54] POSITIVE DISPLACEMENT FLUSHABLE FLOW METER

[75] Inventor: Carl M. Springer, Barrington, Ill.

[73] Assignee: Binks Manufacturing Company, Franklin Park, Ill.

[21] Appl. No.: 324,389

[22] Filed: Mar. 15, 1989

[51] Int. Cl.$^5$ .......................... G01F 3/10; G01F 15/12
[52] U.S. Cl. ........................................ 73/198; 73/253; 73/261
[58] Field of Search ................. 73/261, 202, 258, 253, 73/203, 232, 254, 198; 418/206; 417/283

[56] References Cited

U.S. PATENT DOCUMENTS

| | | | |
|---|---|---|---|
| 1,119,401 | 12/1914 | Clifford | 73/202 X |
| 1,307,337 | 6/1919 | Bassett | 73/202 |
| 2,258,878 | 10/1941 | Bassler | 73/258 X |
| 3,813,940 | 6/1974 | Sommer | 73/198 |
| 4,400,147 | 8/1983 | Springer et al. | 418/206 |
| 4,840,063 | 6/1989 | Twerdochlib | 73/203 |

*Primary Examiner*—Herbert Goldstein
*Attorney, Agent, or Firm*—Juettner Pyle Lloyd & Verbeck

[57] ABSTRACT

A positive displacement flushable flow meter has sensing elements that are rotated by and at a rate in accordance with a flow of fluid through the flow meter. The flow meter is particularly adapted for measuring the volume flow rate of coating material supplied to spray coating apparatus, and to permit the flow meter to be quickly flushed by means of alternate bursts of relatively high velocity air and solvent, without overdriving the sensing elements and damaging the flow meter, a bypass valve is provided. During a spray coating operation, the bypass valve is closed and all of the coating material flows past and rotates the sensing elements. During a flushing operation, the bypass valve is opened to divert some of the relatively high velocity flow of air and solvent around the sensing elements, while allowing a controlled and limited amount of air and solvent to move past and rotate the elements to clean them without causing them to be overdriven.

11 Claims, 2 Drawing Sheets

POSITIVE DISPLACEMENT FLUSHABLE FLOW METER

BACKGROUND OF THE INVENTION

The present invention relates to flow meters, and in particular to a positive displacement flow meter for a spray coating system, which may rapidly be flushed clean of coating material.

Color change systems for spray coating apparatus have particular application in industrial operations where articles are to be spray coated at a spray station or as they move along a production line. Color change systems provide for a wide variety of colors to be sprayed from a single spray gun. With many conventional systems, a plurality of supply containers of coating material, each of a different color and having a separate transfer pump or a source of pressurization for the container, are connected with a manifold of a color changer through valve controlled ports. An outlet from the manifold is coupled to an inlet to a spray gun, and to spray material of a particular color the manifold port valve associated therewith is opened for flow of the material through the manifold to the gun. After completion of spraying material of a particular color, the manifold, gun and connecting line are cleaned with a flushing media, which usually comprises alternate bursts of relatively high velocity solvent and compressed air, to prepare the system for spraying material of a different color.

In many spray coating applications, it is necessary that the quantities of coating materials supplied to the spraying equipment be accurately metered or measured to supply a specified amount of material to be applied onto an article. For the purpose, positive displacement flow meters are often used in line with the outlet from the color changer. Such flow meters may have a pair of sensing elements in the form of meshed gears that are rotated by and at a rate in accordance with the volume flow rate of coating material through the flow meter. The rate of rotation of one of the gears or the rotations made by it is detected and used to provide an indication of the flow rate and/or total volume flow of coating material to the spray apparatus.

Conventional positive displacement flow meters used in paint spraying operations are prone to failure when cleaned with alternate bursts of relatively high velocity air and solvent. The flow meters are designed for specific flow ranges, and have limits on the internal operating speeds of their gears or sensing elements. When such a flow meter is subjected to a flow of relatively high velocity air during flushing, the air causes overdriving or too high a speed of rotation of the sensing elements, which can result in damage to and failure of the flow meter. A second failure mode occurs as a consequence of solvent being injected into the flow meter following the air. When the liquid solvent hits the overdriven sensing elements, the impact can cause severe stress and failure of the flow meter.

OBJECTS OF THE INVENTION

The primary object of the present invention is to provide a positive displacement flow meter having at least one sensing element that is rotated by and at a rate and by an amount in accordance with the volume flow rate and the total volume flow of fluid through the flow meter, which flow meter has a bypass valve that prevents the sensing element from being overdriven in response to the flow meter being flushed with alternate bursts of relatively high velocity air and solvent.

SUMMARY OF THE INVENTION

In accordance with the present invention, a positive displacement flow meter has at least one sensing element that is rotated by and in accordance with a flow of fluid through the flow meter to generate an indication of the volume flow of fluid. To permit the flow meter to be quickly flushed clean by means of alternate applications of relatively high velocity air and liquid solvent, without overdriving the at least one sensing element, the flow meter includes a bypass valve. The bypass valve is operable to establish a shunt path around the at least one sensing element and between an inlet to and an outlet from the flow meter, and when the flow meter is measuring the volume flow of fluid, the bypass valve is closed. During a flushing operation to clean the flow meter, the bypass valve is opened to shunt some of the relatively high velocity air and solvent flow around the at least one sensing element, while still allowing a controlled and limited amount of air and solvent to pass by the at least one sensing element to clean it without causing it to be overdriven.

The foregoing and other objects, advantages and features of the invention will become apparent upon a consideration of the following detailed description, when taken in conjunction with the accompanying drawings.

DETAILED DESCRIPTION

Figure 1:
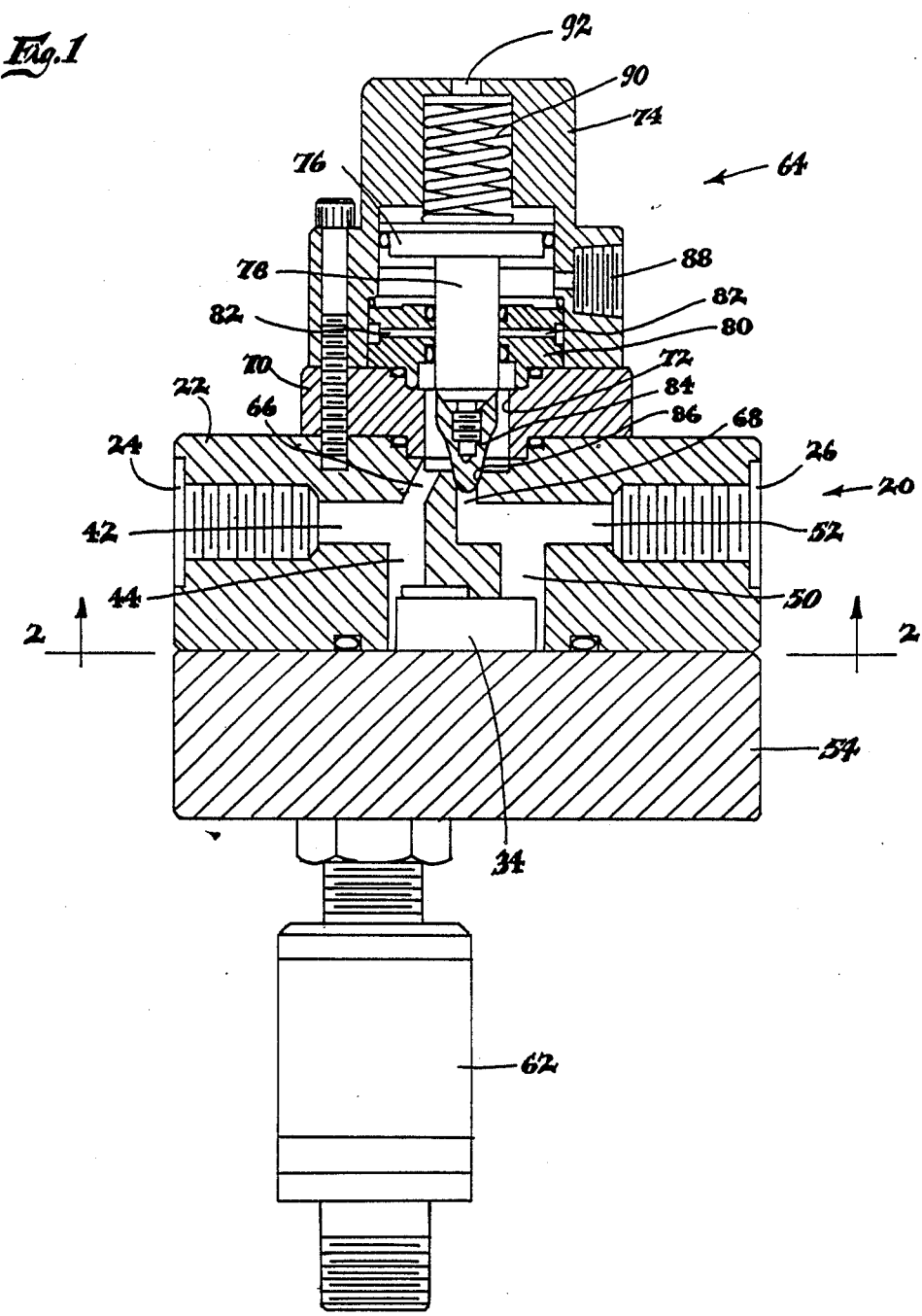
FIG. 1 is a cross-sectional side elevation view of a positive displacement flow meter, having a bypass valve arranged according to one embodiment of the invention.
Figure 2:
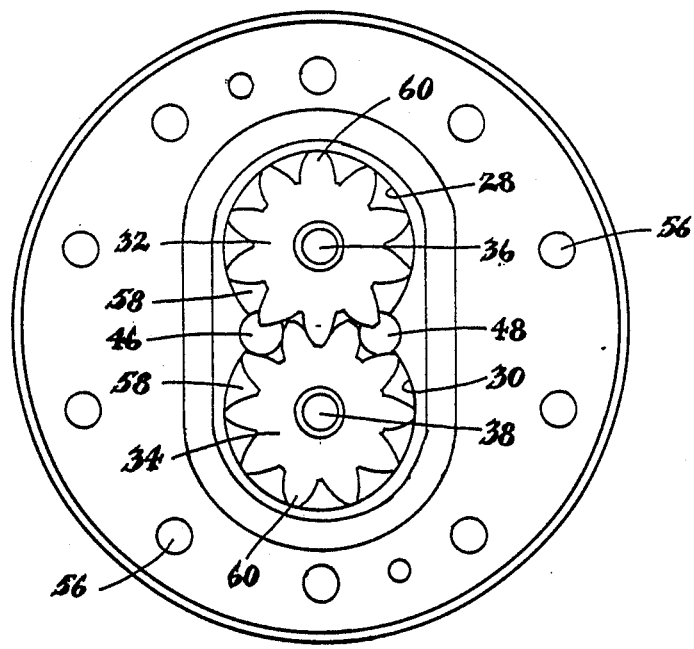
FIG. 2 is a view taken substantially along the lines 2—2 of FIG. 1, and shows sensing elements of the flow meter.

Referring to FIGS. 1 and 2, there is indicated generally at 20 a positive displacement flow transmitter or flow meter of a type with which the teachings of the invention may advantageously be used. The flow meter includes a housing 22 having an inlet 24 and an outlet 26. The housing also has a pair of semicircular openings 28 and 30 in which are received respective sensing elements or gears 32 and 34. The gears are mounted for rotation on respective shafts 36 and 38 in meshing engagement and are sized so that their teeth closely seal with but slide across the walls of the semicircular openings in which they are contained. Housing inlet passages 42 and 44 extend between the inlet 24 and an inlet chamber 46 to one side of the point of meshing of the gears, and an outlet chamber 48 on the other side of the point of meshing connects through housing outlet passages 50 and 52 to the outlet 26. A plate 54 is mounted on and sealed with the housing 22 to enclose the gears and semicircular openings. The housing and plate may conveniently be connected by fasteners (not shown) extended through aligned passages in the same, such as through passages 56 (FIG. 2) in the housing.

The flow meter 20 is adapted to measure the volume flow rate and total volume flow of coating material supplied to spray coating apparatus (not shown), so that a selected amount of material may be applied onto an article. In operation of the flow meter, coating material is supplied under pressure and at a relatively low velocity flow rate to the housing inlet 24 and flows through the passages 42 and 44 to the inlet chamber 46. The coating material in the inlet chamber flows into and fills each gear tooth space 58 of the gears 32 and 34, and the pressure of the material on teeth 60 of the gears causes, with reference to FIG. 2, the gear 32 to rotate in a clockwise direction and the gear 34 in a counter-clockwise direction. As the gears rotate under the influence of the pressure of coating material introduced into the inlet chamber, each gear tooth space is filled with coating material as it passes through the inlet chamber. Then, as the gears continue to rotate, the material is confined in the tooth spaces by the surrounding walls of the openings 28 and 30 until it reaches the outlet chamber 48 where the gear teeth mesh and force the material out of the spaces and through the passage 50 and 52 to the housing outlet 26. The volumetric capacity of the tooth spaces 58 is known, so the revolutions through which the gears are turned represent a measurement of the volumetric flow of coating material through the flow meter.

To detect the revolutions through which the gears are turned, the flow meter 20 has a gear revolution detector 62. The detector may be a transducer which, with the housing 22 being of nonmagnetic material and the gears 32 and 34 of magnetic material, includes a magnetic pickup (not shown) extended into the housing and positioned to sense movement therepast of outer ends of the teeth 60 on one of the gears. The detector generates a signal each time the end of a gear tooth moves past the pickup, whereby the total number of signals generated represents the total volume flow of coating material through the flow meter and the rate at which the signals are generated represents the flow rate of material.

The positive displacement flow meter 20 is of generally conventional structure and well suited for measuring the total volume flow and flow rate of coating material to spray coating apparatus. A difficulty arises, however, when it is used with color change equipment. Since the coating material passes through the flow meter, to change from spraying material of one color to spraying material of another, the flow meter must first be thoroughly cleaned to prevent contamination of coating material colors. The flow meter is connected between an outlet from a color changer (not shown) and an inlet to spraying apparatus (also not shown), and the flushing media normally comprises air and solvent that are alternately injected through the color changer and flow meter at a velocity that is relatively high with respect to the velocity of flow of coating material through the same. However, the flow meter is prone to failure when cleaned in such a manner. The flow meter is designed for specific flow ranges, and has limits on its internal operating speeds, i.e., the speeds of rotation of the gears or sensing elements 32 and 34. When the flow meter is subjected to relatively high velocity air during flushing, the air causes overdriving or too high a speed of rotation of the gears, which can result in damage to and failure of the flow meter. A second failure mode then occurs when solvent is injected into the flow meter following the air. When the liquid solvent hits the rapidly rotating gears, the impact causes severe stress and can result in damage to and failure of the flow meter.

To overcome the problems associated with flushing positive displacement flow meters used in spray coating apparatus, and to permit such flow meters to be quickly cleaned by a relatively high velocity flow of air and solvent without sustaining damage, according to the invention the flow meter 20 includes a bypass valve, indicated generally at 64. During a spray coating operation, when the flow meter is measuring the total volume flow and flow rate of coating material, the bypass valve is closed. During flushing, however, the bypass valve is opened to shunt some of the relatively high velocity flow of air and solvent around the gears or sensing elements 32 and 34, while still allowing a controlled and limited amount of air and solvent to pass by the gears to clean them. The controlled amount is sufficient to ensure proper cleaning of the gears without causing them to be too rapidly rotated and overdriven.

More particularly, the bypass valve 64 is operable to selectively establish a path between a channel 66 in communication with the housing inlet passage 42 and a channel 68 in communication with the housing outlet passage 52, such that when the valve is opened a bypass or shunt path is established for a flow of some of the material introduced at the flow meter inlet 24 around the gears 32 and 34 and directly to the flow meter outlet 26. The bypass valve includes a cylinder end closure 70 having a chamber 72 in communication with the housing channels 66 and 68. A cylinder 74 is carried by the end closure, and a piston 76 having a piston rod 78 is reciprocable in the cylinder. The piston rod is slidable in and sealed with a passage through a guide 80, and channels 82 in the guide accommodate drain off of any material leaking into a space between a pair of seals that seal the piston rod and guide. A tapered valve 84 is at an end of the piston rod within the end closure opening 72, and is movable against and away from a valve seat 86 formed in the housing channel 68 to interrupt and establish a bypass or shunt path between the housing inlet and outlet passages 42 and 52 and around the gears 32 and 34. To establish the bypass path, air under pressure is introduced at an inlet 88 to the cylinder to move the piston and tapered valve away from the seat against the urging of a spring 90, with an opening 92 in the cylinder accommodating escape of air from an opposite side of the piston. To interrupt or close the bypass path, the pressure of air is removed from the inlet 88 for movement of the tapered valve against its seat by the spring. In place of or in addition to the spring for closing the bypass path, air under pressure may be applied to the piston through the opening 92.

In a contemplated use of the flow meter 20, its inlet 24 is connected to an outlet from a color changer (not shown) and its outlet 26 is connected to an inlet to spray coating apparatus (also not shown). During a spray coating operation, the bypass valve 64 is closed, so that all of the relatively low velocity liquid coating material flow supplied by the color changer to the spraying apparatus flows around and past the gears or sensing elements 32 and 34, causing them to rotate through a number of revolutions and at a rate that are directly in accordance with the total volume flow and flow rate of coating material to the spraying apparatus. The number of revolutions through which and the rate at which the gears are turned is sensed by the detector 62. When a selected volume flow of coating material is detected, which is sufficient to coat a single article or a plurality or articles, the supply of coating material to the spraying apparatus is interrupted.

If the color of coating to be next supplied to the spraying apparatus is different from the previously supplied color, the color changer, spraying apparatus, flow meter 20 and connecting lines must first be flushed clean of the previously supplied color of coating material to prevent contamination of the next color of coating material to be supplied. This is accomplished, as is conventional in the spray coating art, by applying alternate bursts of relatively high velocity flows of air and liquid solvent through the color changer and flow meter to the spraying apparatus. Absent the bypass valve 64, the flow meter could be damaged during flushing. The flow meter is designed for specific flow ranges, and has limits on the operating speed or rate of rotation of its gears or sensing elements 32 and 34. If the gears are subjected to the full volume flow of relatively high velocity air and solvent during flushing, the air can cause overdriving or too high a rate or rotation of the gears, resulting in damage to and failure of the flow meter. A second failure mode can then occur when the solvent is injected into the flow meter following the air. When the liquid solvent hits the overdriven or rapidly rotating gears, the impact can cause severe stress and failure of the flow meter.

Accordingly, to permit the flow meter 20 to be rapidly flushed by relatively high velocity flows of air and solvent without the potential for sustaining damage, during flushing the bypass valve 64 is opened to establish the shunt path through the channels 66 and 68 and divert some of the air and solvent around the gears 32 and 34, while still allowing a controlled and limited amount of air and solvent to contact and move past the gears to clean them. The shunt path presents some restriction or resistance to a flow of air and solvent, so a positive pressure differential exists between the inlet chamber 46 to and the outlet chamber 48 from the gears and the gears are rotated and thoroughly cleaned by the air and solvent. The restriction, however, is not so great as to cause overdriving of the gears, but rather is such that the controlled amount of air and solvent moving past the gears is sufficient to ensure proper cleaning of the gears without causing them to be overdriven. At the end of the flushing operation, the bypass valve is closed so that the total volume flow and volume flow rate of coating material next supplied to the coating apparatus is accurately measured.

Figure 3:
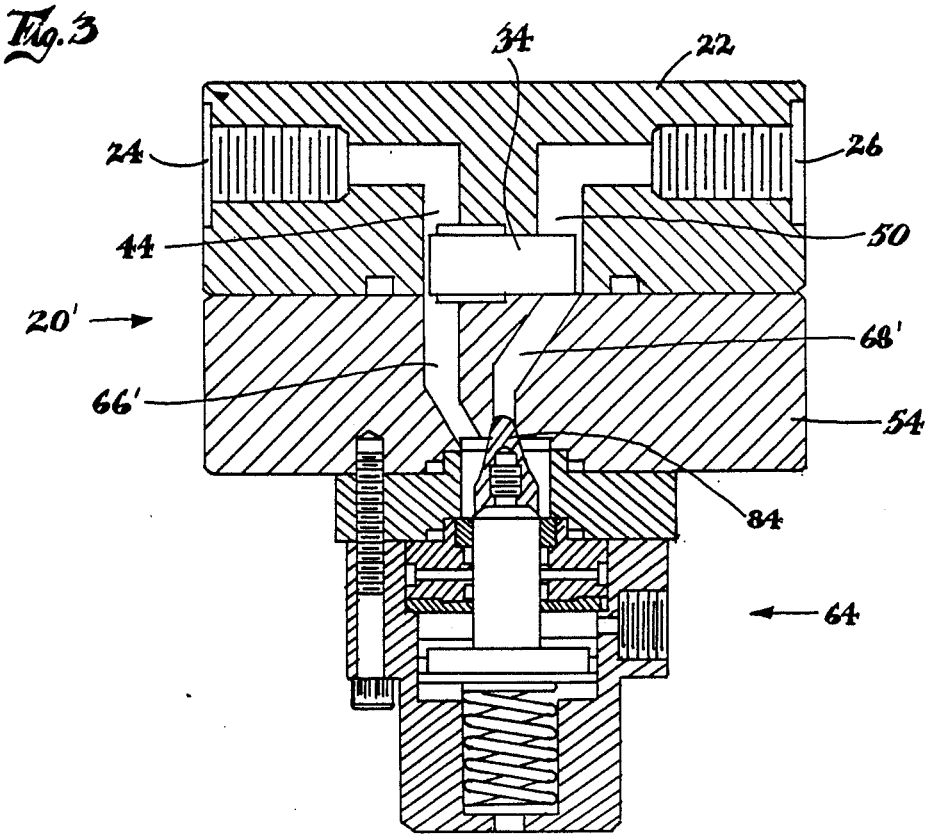
FIG. 3 is a cross-sectional side elevation view of the flow meter, showing the bypass valve arranged in accordance with another embodiment of the invention.

FIG. 3 shows another arrangement of flow meter and bypass valve contemplated by the invention. The flow meter 20' is substantially the same as the one in FIG. 1, except that bypass channels 66' and 68' are formed in the plate 54, so in this case the gear revolution detector 62 (not shown in FIG. 3) would be mounted on the side of the housing 22 opposite from the plate. In this arrangement, the bypass valve 64 is mounted on the plate 54 to interrupt and establish communication between the inlet chamber 46 to and the outlet chamber 48 from the gears 32 and 34 opposite from the inlet passage 44 and outlet passage 50. In operation, the flow meter and bypass valve function in the same manner as described in respect of FIG. 1. When the bypass valve is closed during a spray coating operation, all of the relatively low velocity flow of coating material supplied by the color changer flows past the gears, so that an accurate indication is provided of the volume flow rate and total volume flow of coating to the spraying apparatus. During flushing, the bypass valve is opened to establish a shunt path around the gears, whereupon a controlled amount of air and solvent is carried through the gear tooth spaces 58 to clean the gears without overdriving them. As compared with the embodiment of FIG. 1, an advantage of this particular arrangement is that, during flushing, the gear teeth 60 are exposed to the total volume flow of flushing media at the inlet and outlet chambers 46 and 48.

While embodiments of the invention have been described in detail, various modifications and other embodiments thereof may be devised by one skilled in the art without departing from the spirit and scope of the invention, as defined in the appended claims.

What is claimed is:

1. A positive displacement flow meter for measuring the volume flow of liquid coating material delivered to spray coating apparatus and for being flushed clean of coating material by fluidic flushing media, said flow meter comprising a housing having inlet passage means and outlet passage means; means for supplying either liquid coating material at a first volume flow rate and under pressure or fluidic flushing media at a second and greater volume flow rate and under pressure to said inlet passage means; movable liquid flow sensing means intermediate said inlet and outlet passage means for flow therethrough of coating material and flushing media from said inlet to said outlet passage means, said sensing means being moved in response to and at a rate in accordance with the volume flow rate of coating material or flushing media therethrough and generating an indication of the volumetric flow of coating material flowing therethrough; bypass valve means for selectively shunting a portion of the fluid in said inlet passage means around said flow sensing means to said outlet passage means; and means for operating said bypass valve means so that no fluid is shunted around said flow sensing means when coating material is supplied to said inlet passage means so that a portion of the fluid is shunted around said flow sensing means when flushing media is supplied to said inlet passage means.

2. A positive displacement flow meter as in claim 1, wherein said bypass valve means, when selectively shunting a portion of the fluid, establishes a shunt path between said inlet and outlet passage means so that only a portion of the flushing media supplied to said inlet passage means flows through said flow sensing means to said outlet passage means and the remainder of the flushing media flows through said shunt path.

3. A positive displacement flow meter as in claim 2, wherein said bypass valve means comprises a first channel in communication with said inlet passage means, a second channel in communication with said outlet passage means, and a valve member selectively movable by said operating means between a first position establishing a path and a second position interrupting said path between said first and second channels.

4. A positive displacement flow meter as in claim 1, wherein said movable flow sensing means comprises at least one flow sensing element that is rotated by fluid flowing through said flow sensing means and at a rate in accordance with the volumetric flow rate of the fluid, and said bypass valve means, in shunting a portion of the flushing media around said flow sensing means, permits only a limited amount of the flushing media to pass through said flow sensing means to clean said flow sensing means without causing said at least one sensing element to be rotated at an excessive rate.

5. A positive displacement flow meter as in claim 4, wherein said at least one sensing element comprises a pair of gears in meshing engagement and having tooth spaces in which fluid is carried from said inlet to said outlet passage means, and the rate of rotation of said gears, when no fluid is shunted around said flow sensing means, is in accordance with the volume flow rate of coating material through said flow sensing means, and including means for detecting the revolutions through which said gears are rotated to detect the volume flow of coating material through said flow sensing means.

6. A positive displacement flow meter as in claim 5, wherein said gears are rotated in response to a differential in the pressure of fluid between said inlet and outlet passage means, and said bypass valve means maintains a pressure differential of fluid when operated to shunt a portion of the fluid in said inlet passage means around said flow sensing means.

7. A method of operating a positive displacement flow meter having at least one sensing element that is rotated in response to and at a rate in accordance with the volume flow rate of fluid through the flow meter, wherein the flow meter measures the volume flow of liquid coating material supplied under pressure to a spray coating apparatus, if flushed clean of coating material by fluidic flushing media, and the at least one sensing element has a maximum rate of rotation beyond which damage to the flow meter can occur, said method comprising the steps of supplying liquid coating material under pressure and at a first flow rate through the flow meter to the spray coating apparatus; detecting the revolutions through which the at least one sensing element is turned by the coating material to measure the volume flow of the coating material through the flow meter to the spray coating apparatus; upon completion of supplying coating material, delivering fluidic flushing media under pressure and at a second and greater flow rate through the flow meter to clean the same of coating material; and, during performance of said flushing media delivering step, shunting a portion of the flushing media around the at least one sensing element so that the at least one sensing element is exposed to only some of the flushing media which is sufficient to clean the at least one sensing element of coating material but is less than sufficient to rotate the at least one sensing element faster than its maximum rate of rotation.

8. A method as in claim 7, wherein said shunting step comprises establishing a bypass path around the at least one sensing element.

9. A method as in claim 7, wherein the at least one sensing element is rotated in response to a differential in the pressure of fluid thereacross, and said shunting step maintains a differential in the pressure of flushing media across the at least one sensing element.

10. A positive displacement flow meter for measuring the volume flow of liquid coating material delivered to spray coating apparatus and for being flushed clean of coating material by fluidic flushing media, said flow meter comprising a housing having an inlet and an outlet; means for supplying either liquid coating material under pressure or fluidic flushing media under pressure to said inlet; movable fluid flow sensing means in said housing intermediate said inlet and outlet for flow therethrough of coating material and flushing media from said inlet to said outlet, said sensing means being moved in response to and by an amount in accordance with the volume flow of coating material or flushing media therethrough and generating an indication of the volumetric flow of coating material flowing therethrough; bypass valve means for selectively shunting a portion of the fluid from said inlet around said flow sensing means to said outlet; and means for operating said bypass valve means so that no fluid is shunted around said flow sensing means when coating material is supplied to said inlet and so that a portion of the fluid is shunted around said flow sensing means when flushing media is supplied to said inlet.

11. A method of supplying a measured volume of liquid coating material to spray coating apparatus, comprising the steps of supplying liquid coating material to the spray coating apparatus through a path including a movable fluid flow sensor that is moved in response to and by an amount in accordance with the volume flow of coating material therethrough; measuring the volume flow of coating material through the fluid flow sensor in accordance with the amount of movement thereof; upon the measured volume flow of coating material reaching a selected value, interrupting said supplying step and delivering fluid flushing media through the path and the fluid flow sensor to clean the same; and, during performance of said delivering step, shunting a portion of the flushing media in the path around the fluid flow sensor.

* * * * *